(12) United States Patent
Darby

(10) Patent No.: US 7,293,524 B2
(45) Date of Patent: Nov. 13, 2007

(54) INDICATOR DEVICE FOR INDICATING WHETHER A NO-BACK DEVICE IS OPERABLE

(75) Inventor: Jonathan Alan Darby, Newcastle-Under-Lyme (GB)

(73) Assignee: Goodrich Actuation Systems Limited (GB)

( * ) Notice: Subject to any disclaimer, the term of this patent is extended or adjusted under 35 U.S.C. 154(b) by 75 days.

(21) Appl. No.: 11/297,801

(22) Filed: Dec. 8, 2005

(65) Prior Publication Data

US 2006/0137596 A1 Jun. 29, 2006

(30) Foreign Application Priority Data

Dec. 9, 2004 (GB) ................................. 0426948.6

(51) Int. Cl.
*F16D 41/12* (2006.01)
*G01P 13/00* (2006.01)

(52) U.S. Cl. ........................ 116/281; 116/208; 188/71.2

(58) Field of Classification Search ................ 116/203, 116/208, 230, 277, 281, 282, 283, 285, 324; 188/71.2; 340/686.1, 686.3, 686.4
See application file for complete search history.

(56) References Cited

U.S. PATENT DOCUMENTS 2,782,518 A * 2/1957 Tieman ........................ 33/611
3,216,571 A * 11/1965 Whiting et al. ............... 210/90
4,058,079 A * 11/1977 Taylor et al. ................ 116/283
4,317,971 A    3/1982 Roth ........................... 200/83 J
4,762,205 A    8/1988 Ortman ...................... 188/71.2
5,576,525 A   11/1996 Umemura ................... 200/539
5,616,157 A *  4/1997 Mead et al. ................... 96/421
6,343,564 B1 * 2/2002 Miller et al. ................ 116/281
6,357,384 B1 * 3/2002 Laymon et al. ............ 116/281
6,580,234 B2 * 6/2003 Capewell ....................... 318/3
6,925,958 B2 * 8/2005 Groeneveld ................. 116/282

FOREIGN PATENT DOCUMENTS

EP    1 378 685    1/2004
GB      914 133   12/1962

* cited by examiner

*Primary Examiner*—R. Alexander Smith
(74) *Attorney, Agent, or Firm*—Andrus, Sceales, Starke & Sawall, LLP

(57) ABSTRACT

An indicator device for use in indicating whether or not a no-back device is operable, the indicator device comprising an indicator member 42 moveable between a first position and a second position, a biasing arrangement 56 being provided to urge the indicator member 42 towards its first position, and a latch arrangement 46 being provided to allow the indicator member 42 to be held, against the biasing load of the biasing arrangement 56, in its second position, the indicator member 42 being adapted such that, in use of the associated no-back device, movement of the pawl 30 of the no-back device causes the indicator member 42 to be moved out of its second position.

11 Claims, 2 Drawing Sheets

INDICATOR DEVICE FOR INDICATING WHETHER A NO-BACK DEVICE IS OPERABLE

This invention relates to an indicator device intended for use in providing an indication of whether or not a no-back device is operating correctly, and to a no-back device incorporating such an indicator device.

Linear actuators, for example ball-screw or acme screw actuators, are commonly used to drive the control surfaces or flaps of an aircraft, for example between stowed and deployed positions. They are also used in driving other components, for example parts of thrust reverser devices, hatches and doors. Once the linear actuator has been used to drive a component from one position or condition to another, it is desirable to switch off the power to the actuator. However, depending upon the application in which the linear actuator is used, external forces applied to the component with which the actuator is used may drive the actuator in the reverse direction returning the component to or towards its initial condition.

In order to avoid such reverse driving it is known to associate a no-back device with the linear actuator. The no-back device is designed to allow substantially free operation of the linear actuator in one direction, but to apply a braking load to resist movement in the opposite direction. One simple form of no-back device includes a ratchet ring on which a series of teeth are formed, one or more pawls being provided to engage the teeth. Rotation of the ratchet ring in one direction is permitted, the pawls riding over the teeth. However, engagement between the pawls and teeth prevents rotation in the opposite direction. A friction brake arrangement is typically provided between the ratchet ring and the actuator shaft of the actuator so as to prevent the component from being driven back towards its initial condition or position. Drive from a motor is used to overcome the resistance of the friction brake when it is desired to return the component to its initial position. A no-back device of this general type is described in EP 1378685.

In use the engagement between the pawls and teeth may result in the pawls and/or the teeth becoming worn to such an extent that the engagement between the pawls and the teeth is no longer capable of preventing reverse rotation of the ratchet ring. It is desirable to be able to monitor whether or not the no-back device is operating correctly.

U.S. Pat. No. 4,762,205 describes an arrangement in which, during use of the no-back device, a Hall effect device is used to sense movement of the pawls. The Hall effect device includes a rod attached to an associated pawl, the rod carrying a magnet, and a Hall effect sensor arranged to sense changes in magnetic field arising from movement of the rod and magnet. In use, the pawl and associated rod may move at a rate of 30 to 60 strokes per second and the resultant wear of the rod may be problematic. Further, the electronic system necessary to monitor the output of the Hall effect sensor to determine whether or not the no-back device is operating correctly is fairly complex, expensive, heavy and not suited for use in the harsh environments in which no-back devices are generally located.

It is an object of the invention to provide an indicator of simple and convenient form to allow determination of whether or not a no-back device is functioning.

According to the present invention there is provided an indicator device for use in indicating whether or not a no-back device is operable, the indicator device comprising an indicator member moveable between a first position and a second position, a biasing arrangement being provided to urge the indicator member towards its first position, and a latch arrangement being provided to allow the indicator member to be held, against the biassing load of the biassing arrangement, in its second position, the indicator member being adapted such that, in use of the associated no-back device, movement of the pawl of the no-back device causes the indicator member to be moved out of its second position.

In order to test that the no-back device with which the indicator device is associated is operative, the indicator member is moved to its second position and held in that position by the latch arrangement. The no-back device is then operated in the direction of forward rotation. If the no-back device is not worn or has only a little wear, then the pawl of the no-back device will ride up and over the teeth of the ratchet ring. The movement of the pawl forces the indicator member out of its second position, the indicator member returning to its first position under the action of the biassing means and thereby providing an indication that the no-back device is operable. If the no-back device is worn to such an extent that the engagement between the pawl and the teeth is insufficient to prevent reverse movement, then little movement of the pawl will occur, the movement being insufficient to force the indicator member out of its second position, thereby providing an indication that the no-back device is unacceptably worn.

The indicator member is preferably slidable, axially, between its first and second positions. The biassing arrangement conveniently comprises a coiled spring.

The latch arrangement preferably comprises a latch member resiliently biassed into engagement with a side surface of the indicator member, the latch member preferably engaging in a groove provided in the indicator member when the indicator member occupies its second position.

A second groove may be provided in the indicator member in which the latch member engages when the indicator member occupies its first position.

The indicator member is conveniently arranged to engage, directly, the associated pawl of the no-back device.

The invention also relates to a no-back device comprising a toothed ratchet ring, at least one pawl co-operable with the teeth of the ratchet ring to allow rotation of the ratchet ring in a forward direction and prevent reverse rotation of the ratchet ring, and an indicator device of the type defined hereinbefore and operable to provide an indication that the pawl of the ratchet ring moves beyond a pre-determined position upon rotation of the ratchet ring in the forward direction.

The no-back device may include more than one pawl. Where two or more pawls are provided, each pawl may have an indicator device associated therewith.

The invention will further be described, by way of example, with reference to the accompanying drawings, in which.

Figure 1:
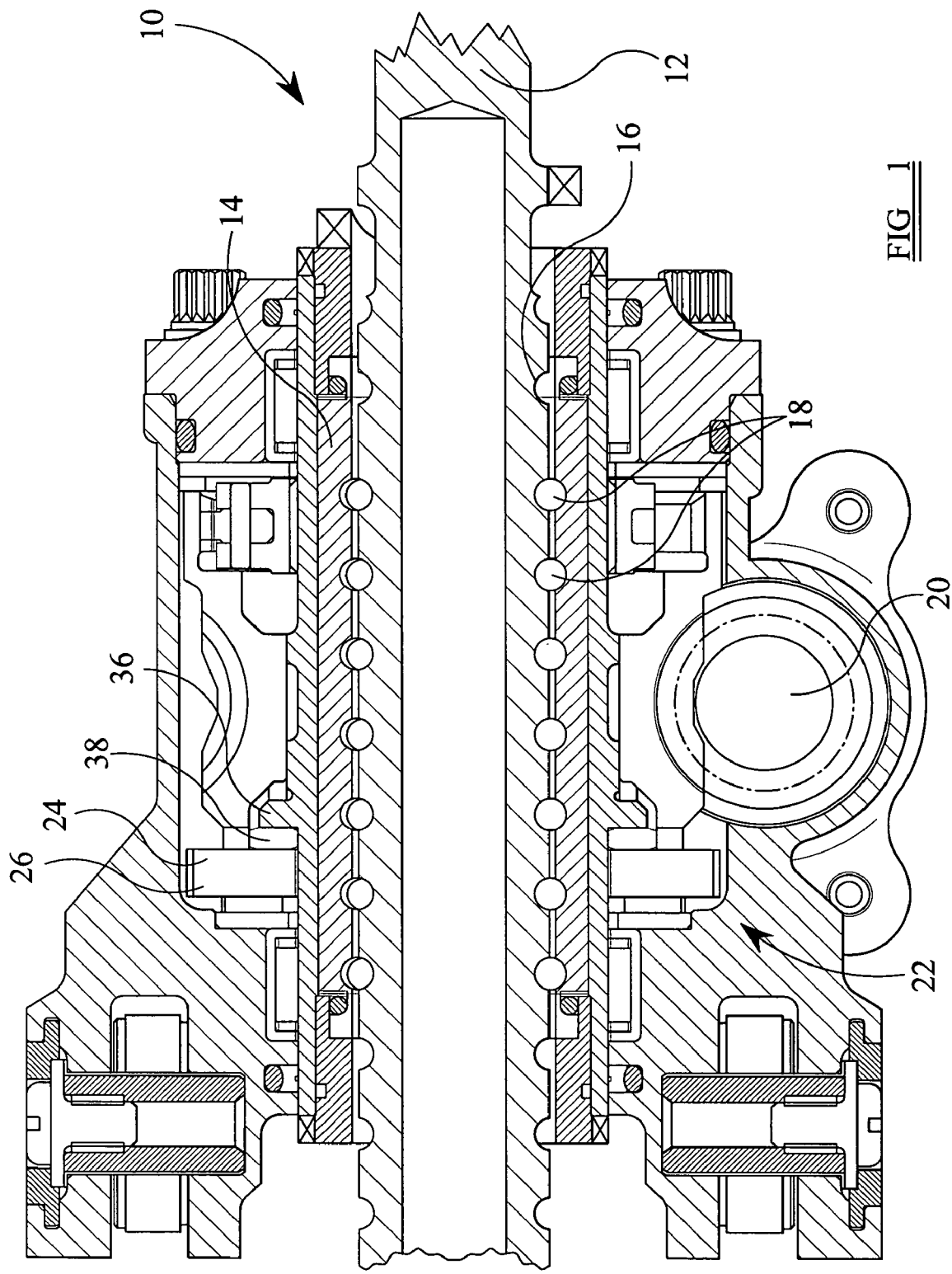
FIG. 1 is a view illustrating an actuator including a no-back device.
Figure 2:
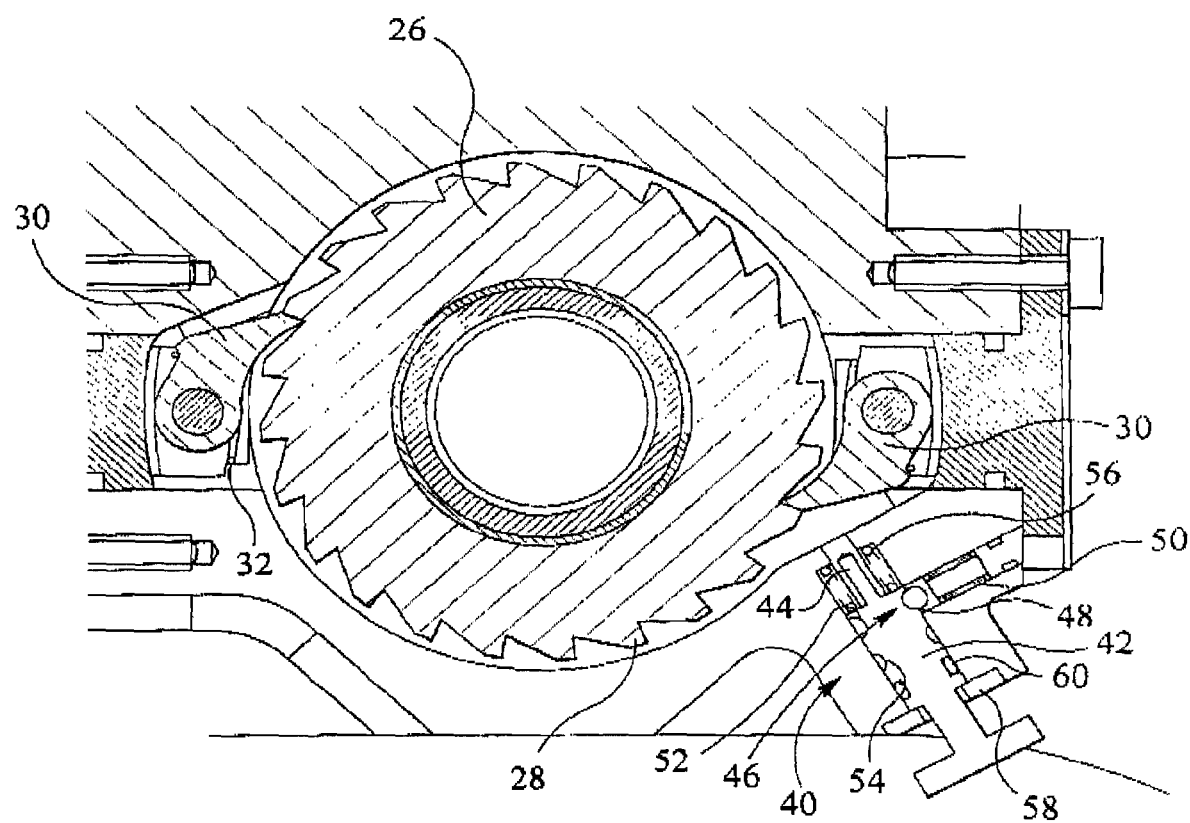
FIG. 2 is another view of the no-back device, illustrating an indicator device in accordance with an embodiment of the invention.

FIGS. 1 and 2 illustrate part of a linear actuator 10 in the form of a ball screw actuator. The actuator 10 comprises a shaft 12 which is moveable axially but held against angular movement. Encircling the shaft 12 is a sleeve 14 which is held substantially against axial movement, but which is free to rotate. The shaft 12 and sleeve 14 are formed with corresponding helical grooves 16 within which a series of spherical elements 18 are located. A motor 20 is provided to drive the sleeve 14 through a drive arrangement 22. In use, operation of the motor 20 causes the sleeve 14 to rotate about its axis. The rotary movement of the sleeve 14 is transmitted by the spherical elements 18 in the grooves 16 to the shaft 12 causing the shaft 12 to translate, axially, thereby causing movement of a component secured, in use, to the shaft 12. It will be appreciated that the direction of linear movement of the shaft 12 is dependent upon the direction in which the motor 20 drives the sleeve 14 for rotation.

The drive arrangement 22 includes a no-back device 24. The no-back device is arranged to allow substantially free rotation of the sleeve 14 in one direction, so as to allow substantially free linear movement of the shaft 12 in one direction, but to apply a relatively large braking load to resist movement of the sleeve 14 in the opposite direction. The purpose of this is to provide a braking load to resist reverse movement of the component with which the actuator is associated under the application of an external load.

The no-back device comprises a ratchet ring 26 having a series of ramped teeth 28 formed thereon. A pair of pawls 30 are provided, each pawl 30 being pivotally mounted to the housing of the actuator 10 and being arranged to co-operate with the teeth 28 of the ratchet ring 26 so as to allow substantially free rotation of the ratchet ring 26 in one direction but to inhibit or restrict rotation of the ratchet ring 26 in the opposing direction. Springs 32 are provided to urge the pawls 30 into engagement with the ratchet ring 26.

The sleeve 14 includes an outwardly extending abutment 36, a brake disc 38 being located between the ratchet ring 26 and abutment 36 to transmit rotary movement of the sleeve 14 to the ratchet ring 26. In operation, the brake disc 38 resists rotation of the sleeve 14 in the reverse direction when rotation of the ratchet ring 26 is prevented by the pawls 30. The brake disc 38 is arranged to allow rotation of the sleeve 14 in the reverse direction in the event that the load applied to the sleeve 14 by the motor 20 exceeds a predetermined amount, to allow the component with which the actuator is associated to be driven, for example, to its original position.

In accordance with the invention, an indicator device 40 is provided to allow monitoring of the operation of the no-back device. The indicator device 40 comprises an indicator member 42 which is slidable within a bore formed in the housing of the actuator 10. The indicator member 42 includes, at one end thereof, a projection 44 adapted to be co-operable with part of an associated one of the pawls 30. The indicator member 42 is slidable within the associated bore between a first position as shown in FIG. 2 and a second position in which the projection 44 extends from the bore to a position adjacent the pawl 30.

A latch arrangement 46 is associated with the indicator member 42. The latch arrangement 46 comprises a spherical latch member 48 biassed by means of a spring 50 into engagement with a side surface of the indicator member 42. The indicator member 42 is provided with a groove 52 in which the latch member 48 engages when the indicator member 42 occupies its first position. A second groove 54 is also provided in which the latch member 48 engages when the indicator member 42 occupies its second position. A spring 56 is provided to bias the indicator member 42 towards its first position, and the latch arrangement 46 is sufficient to allow the indicator member 42 to be held in its second position against the action of the spring 56, in use.

The housing within which the ratchet ring 26 is located is filled with oil, and in order to minimise the escape of oil due to the presence of the indicator device 40, an O-ring or other sealing device 60 is provided to form a seal between the indicator member 42 and the housing defining the bore within which the indicator member 42 is slidable. A similar seal is provided to avoid leakage past the latch arrangement.

A suitably shaped catch plate 58 is mounted on the housing and arranged to engage the indicator member 42 to prevent the indicator member 42 from fully escaping from the housing.

In normal use of the actuator and no-back device, the indicator device is not used. However, during inspection, routine maintenance or the like, it is desirable to be able to determine whether or not the no-back device has experienced significant levels of wear, and in particular whether or not the device has worn to an extent such that it is no longer capable of resisting return movement. In order to provide such an indication, the indicator member 42 is moved, manually, from its first position (as illustrated) to its second position against the action of the spring 56. Once in its second position, the latch member 48 engages in the second groove 54 under the action of the spring 50, holding the indicator member 42 in its second position against the action of the spring 56. Subsequently, the actuator is operated. The operation will cause rotation of the ratchet ring 26 in the forward direction which in turn requires the pawls 30 to ride up and over the teeth 28 of the ratchet ring 26. As the pawls 30 ride up the teeth 28, the pawls 30 pivot about their pivot points and a point will be reached at which the pawl 30 adjacent the indicator device 40 will engage the projection 44 of the indicator member 42. Continued movement of the ratchet ring 26 and pawl 30 will cause the indicator member 42 to be pushed out of its second position, the latch member 48 being forced out of the second groove 54 against the action of the spring 50, and once such movement has occurred to release or disengage the latch arrangement, the indicator member 42 will return to its first position under the action of the spring 56. The return of the indicator member 42 to its first position provides an indication that the no-back device is capable of operating normally.

In the event that the teeth 28 of the no-back device have worn to such an extent that forward operation of the no-back device does not result in the pawl 30 moving to a position in which it is able to cause the indicator member 42 to be returned to its first position, then this will provide an indication that the no-back device is no longer serviceable and requires replacement.

It is possible, in normal use, for the no-back device to stop at an angular position in which the pawl 30 is partway up the ramped surface of an associated one of the teeth 28. If this occurs, then it may not be possible for the indicator member 42 to be pushed to its second position and held in that position by the latch arrangement. The inability of the indicator member 42 to be moved to its second position can be taken as an indication that the teeth 28 are not excessively worn and the no-back device is capable of operating correctly.

Although the arrangement described hereinbefore illustrates the provision of only one indicator device 40, a second indicator device could be provided, if desired, the second indicator device being associated with the other one of the pawls 30.

Although a specific embodiment of the invention has been described hereinbefore, it will be appreciated that a range of modifications may be made thereto. For example, an alternative form of latch device may be used to hold the indicator member 42 in its second position. Further, although the latch arrangement illustrated herein allows the indicator member 42 to be latched in its first position as well as its second position, this may not always be necessary. A range of other modifications and alterations are also possible within the scope of the invention.

The invention claimed is:

1. An indicator device in combination with a no-back device having a pawl, the indicator device being arranged to indicate whether or not the no-back device is operable, the indicator device comprising an indicator member movable between a first position and a second position, a biassing arrangement being provided to urge the indicator member towards the first position, and a latch arrangement being provided to allow the indicator member to be held, against the biassing load of the biassing arrangement, in the second position, the indicator member being adapted such that, in normal use of the associated no-back device, movement of the pawl of the no-back device causes the indicator member to be moved out of the second position, wherein the indicator member is arranged to engage, directly, the pawl of the no-back device.

2. A device according to claim 1, wherein the indicator member is slidable, axially, between the first and second positions.

3. A device according to claim 1, wherein the biassing arrangement comprises a coiled spring.

4. A device according to claim 1, wherein the latch arrangement comprises a latch member resiliently biased into engagement with a side surface of the indicator member.

5. A device according to claim 4, wherein the latch member engages in a groove provided in the indicator member when the indicator member occupies the second position.

6. A device according to claim 5, further comprising a second groove in which the latch member engages when the indicator member occupies the first position.

7. A device according to claim 4, wherein the latch member is of spherical form.

8. A no-back device comprising a toothed ratchet ring, at least one pawl co-operable with the teeth of the ratchet ring to allow rotation of the ratchet ring in a forward direction and prevent reverse rotation of the ratchet ring, and an indicator device operable to provide an indication that the pawl moves beyond a pre-determined position upon rotation of the ratcheting in the forward direction, the indicator device comprising an indicator member movable between a first position and a second position, a biassing arrangement being provided to urge the indicator member towards the first position, and a latch arrangement to allow the indicator member to be held, against the biassing load of the biassing arrangement, in the second position, the indicator member being adapted such that, in normal use of the associated no-back device, movement of the pawl of the no-back device causes the indicator member to be moved out of the second position.

9. A no-back device according to claim 8, further comprising at least one further pawl.

10. A no-back device according to claim 9, wherein each pawl has an indicator device associated therewith.

11. A linear actuator device including a no-back device as claimed in claim 8.

* * * * *